United States Patent [19]

Krebs et al.

[11] 4,405,728
[45] Sep. 20, 1983

[54] COMPOSITIONS FOR ON-SITE MANNICH POLYMER PROCESS

[75] Inventors: Richard F. Krebs, LaGrange; Patrick J. Marek, Geneva; Kenneth G. Phillips, River Forest, all of Ill.

[73] Assignee: Nalco Chemical Company, Oak Brook, Ill.

[21] Appl. No.: 339,563

[22] Filed: Jan. 15, 1982

[51] Int. Cl.$^3$ .......................... C08J 3/06; C08L 33/26
[52] U.S. Cl. ..................................... 523/336; 524/555
[58] Field of Search ....................... 524/512, 555, 922; 523/336

[56] References Cited

U.S. PATENT DOCUMENTS

| | | | |
|---|---|---|---|
| 3,178,385 | 4/1965 | Dinges et al. | 525/512 |
| 3,624,019 | 11/1971 | Anderson . | |
| 3,734,873 | 5/1973 | Anderson et al. | 523/336 |
| 3,979,348 | 9/1976 | Ballweber et al. . | |
| 4,013,606 | 3/1977 | Ballweber et al. . | |
| 4,021,394 | 5/1977 | Tuka et al. . | |
| 4,022,741 | 5/1977 | Tuka et al. | 523/336 |

*Primary Examiner*—Allan Lieberman
*Attorney, Agent, or Firm*—Robert A. Miller

[57] ABSTRACT

The abstract of the disclosure is a method of rapidly preparing a dilute aqueous solution of poly N,N lower dialkylaminomethyl acrylamide and copolymers thereof having a molecular weight greater than 500,000 and a cationic charge of 1–90% which comprises:

A. forming a water-in-oil emulsion of polyacrylamide or copolymers thereof, said water-in-oil emulsion containing in weight percentages:
 (1) 5 to 60% polymer;
 (2) 5 to 75% hydrophobic liquid;
 (3) 0.1 to 21% water-in-oil emulsifying agent;
 (4) 2 to 90% water;
B. adding to the water-in-oil emulsion of step A a water soluble salt of a secondary amine having alkyl groups containing 1–3 carbon atoms in an amount, so as to provide 0.1–1.1 moles of secondary amine for each mole of amide functionality on said polymer;
C. preparing a dry formaldehyde composition by mixing together:
 (1) paraformaldehyde;
 (2) dry alkalinity control agent
 (3) water-soluble high HLB surfactant capable of inverting the water-in-oil emulsion of step A;
D. mixing together the water-in-oil emulsion containing the lower alkyl secondary amine salt with a quantity of the dry formaldehyde composition sufficient to provide from 0.1–1.1 mole of formaldehyde per mole of secondary amine and from 0.05–10% water-soluble surfactant based on the weight of water-in-oil emulsion used with a quantity of water, so as to obtain a 0.1–10% by weight aqueous solution of N,N-dialkylaminomethyl acrylamide.

9 Claims, No Drawings

COMPOSITIONS FOR ON-SITE MANNICH POLYMER PROCESS

INTRODUCTION

High molecular weight cationically charged water-soluble polymers are used as dewatering agents in the treatment of industrial and municipal waste materials as retention and drainage aids in the manufacture of paper, as flotation aids in the processing of minerals, and in other applications.

Particularly interesting materials which have been known to the art for quite sometime, copolymers and homopolymers of N,N-dimethylaminomethyl acrylamide, have met with limited commercial success. While being relatively inexpensive, based upon its known preparation from a polyacrylamide, a lower alkyl secondary amine, generally dimethylamine, and formaldehyde, these materials are not stable and any excess formaldehyde present tends to cause crosslinking, making the polymer ineffective for its intended use. This crosslinking problem is described in U.S. Pat. No. 3,790,529, which is hereinafter incorporated by reference.

While various methods have been attempted to prepare polymers of this type which can be shipped in high concentration, retain their cationic charge, which are easy to prepare, none of these methods have been commercially successful.

In U.S. Pat. No. 3,979,348 there is proposed to react a water-in-oil emulsion of polyacrylamide or a copolymer thereof with dimethylamine and formaldehyde. While materials of this type can be prepared, the mannich reaction employed is of an equilibrium type, with the result being that there is always excess formaldehyde present. This excess formaldehyde tends to react with the polymer during storage in a manner not intended, resulting in a material crosslinked which is not water-soluble. In U.S. Pat. No. 4,022,741 it is proposed to react a water-in-oil emulsion of acrylamide or a copolymer thereof in a continuous process stream containing therein dimethylamine, formaldehyde, and sufficient surfactant to cause inversion of the water-in-oil emulsion. While this procedure is practical, and has been employed, expensive mixing equipment is necessary including mixers, metering pumps, and the like. Since many industries which find use of cationic polymers advantageous do not have this equipment, this method has accordingly not gained widespread commercial success.

Other methods for preparing polymeric material of this type include formation of water-in-oil emulsions of N,N-dimethyl aminomethyl acrylamide such as those described in U.S. Pat. No. 3,979,348; but, with the addition of various materials which will react with any free formaldehyde. Materials of this type include those described in U.S. Pat. Nos. 3,988,277; 4,073,763 and 4,113,685; and have not met with great commercial success. Materials such as sulfur dioxide create objectionable odors and additional materials, generally ureas and amines, when added may cause undesirable reactions with the polymeric material as well as create odor problems. In addition, the use of excess amine materials as scavenging agents adds excess nitrogen material to work waters which in many cases must be avoided.

Accordingly, it would be an advance to the art if a method could be found which enable the preparation of highly charged high molecular weight cationic polymers from relatively inexpensive starting materials including polyacrylamide, lower alkyl secondary amines, and formaldehyde. Such a process should allow preparation of the cationically charged materials at the site of use to eliminate crosslinking problems, would not present handling problems, and would present no odor or other health problems to workers preparing polymers of this type.

It is therefore an object of this invention to provide a method for the preparation of polymers and copolymers of N,N-dimethylaminomethyl acrylamide from water-in-oil emulsion of polyacrylamide, a dimethylamine salt, and a specially formulated dry formaldehyde composition.

Other objects will appear hereinafter.

THE INVENTION

This invention discloses a method of rapidly preparing a dilute aqueous solution of poly N,N-diloweralkylaminomethyl acrylamide and copolymers thereof having a molecular weight greater than 500,000 and a cationic charge of from 1–90% which comprises:

(a) forming a water-in-oil emulsion of polyacrylamide or copolymers thereof, said water-in-water emulsion containing in weight percentages:
   (1) 5 to 60% polymer;
   (2) 5 to 75% hydrophobic liquid;
   (3) 0.1 to 21% water-in-oil emulsifying agent;
   (4) 2 to 90% water.
(b) adding to the water-in-oil emulsion of step (a) a water-soluble salt of a lower alkyl secondary amine having 2–5 carbon atoms in an amount so as to provide 0.1–1.1 moles of secondary amine for each mole of amide functionality on said polymer;
(c) preparing a dry formaldehyde composition by mixing together:
   (1) paraformaldehyde;
   (2) dry alkalinity control agent;
   (3) water-soluble high HLB surfactant capable of inverting the water-in-oil emulsion of step (a);
(d) mixing together the water-in-oil emulsion containing the lower alkyl secondary amine salt with a quantity of the dry formaldehyde composition sufficient to provide from 0.1–1.1 mole of formaldehyde per mole of secondary amine and from 0.5–10% water-soluble surfactant based on the weight of water-in-oil emulsion used with a quantity of water, so as to obtain a 0.1–10% by weight aqueous solution of N,N-dialkylaminomethyl acrylamide.

THE WATER-IN-OIL ELUMSIONS OF WATER SOLUBLE ACRYLAMIDE POLYMERS

The water-in-oil emulsions of water-soluble acrylamide polymers useful in this invention contain four basic components. These components and their weight percentages in the emulsions are listed below:

A. Water-soluble acrylamide polymer:
  1. Generally from 5–60%;
  2. Preferably from 20–40% and
  3. Most preferably from 25–35%;
B. Water:
  1. Generally from 2–90%;
  2. Preferably from 20–70%; and
  3. Most preferably from 30–55%;
C. Hydrophobic liquid:
  1. Generally from 5–75%;
  2. Preferably from 5–40%; and 3. Most preferably from 20–30%; and
D. Water-in-oil emulsifying agent:
 1. Generally from 0.1–21%;
 2. Preferably from 1–15%; and
 3. Most preferably from 1.2–10%.

It is also possible to further characterize the water-in-oil emulsions of water-soluble acrylamide polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 30. Preferably, the water-in-oil ratio will range from 0.5–14, and most preferably from 1.0–2.75.

The Water-Soluble Acrylamide Polymers

The water-soluble acrylamide polymers useful in this invention are homo or copolymers of acrylamide or methacrylamide. Comonomers useful in the water-soluble acrylamide copolymers of this invention include cationic, nonionic, and anionic monomers which will polymerize with acrylamide and yield a water-soluble copolymer. Examples of these monomers include, dialyldimethylammonium chloride, dimethylaminoethylmethacrylate, dimethylaminoethylmethacrylate quaternaries, N-vinyl pyrollidone, styrene, ethyl acrylate, methyl acrylate, methylmethacrylate, ethylmethacrylate, acrylamidomethylpropanesulfonic acid, acrylic acid, methacrylic acid, acrylonitrile, etc.

When copolymers are prepared, caution should be undertaken so that the final resultant material is water-soluble.

Additionally, when copolymers of acrylamide are employed, at least 10% and preferably 50% of the monomeric content of the polymer should be of acrylamide mers.

The preferred water-soluble polymer for use in this invention is polyacrylamide.

The acrylamide polymers which are used in this invention may have a molecular weight of from several hundred thousand to several million. Preferably, materials used in this invention should have molecular weights ranging from 500,000 to 30 million and should most preferably have a molecular weight of from 750,000 to 20 million. A preferred polyacrylamide has a molecular weight of approximately 1 million.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the trade name, "Isopar M," described in U.S. Pat. No. 3,624,019, and a paraffinic solvent sold by the Exxon Company, U.S.A called, "Low Odor Paraffinic Solvent." Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and, in certain instances, petroleum may be used. While useful in this invention, solvents, such as benzene, xylene, toluene, and other water immiscible hydrocarbons having low flash points or toxic properties, are generally avoided due to problems associated with their handling.

The Water-In-Oil Emulsifying Agents

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used, as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMUSIONS OF WATER-SOLUBLE VINYL ADDITION POLYMERS

The general method for the preparation of emulsions of the type described above is contained in Vanderhoff, U.S. Pat. No. 3,284,393, which is hereinafter incorporated by reference. A typical procedure for preparing the water-in-oil emulsions of this type includes preparing an aqueous solution of a water-soluble vinly addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble vinyl addition polymer is obtained. It should be pointed out that the ingredients are chosen based upon the weight percentages given above and their compatability with each other. As to choice of free radical catalyst, these materials may be either oil or water soluble and may be from the group consisting of organic peroxides, materials sold under the Vazo trademark, redox-type initiator systems, etc. Additionally, ultraviolet light, microwaves, etc., will also cause the polymerization of water-in-oil emulsions of this type.

In the manufacture of emulsions of this type, which are further detailed in U.S. Pat. No. 3,624,019, U.S. Pat. No. 28,474; U.S. Pat. No. 3,734,873, U.S. Pat. No. Re. 28,576; and U.S. Pat. No. 3,826,771, all of which are hereinafter incorporated by reference, the use of air may be employed to control polymerization. This technique is described in U.S. Pat. No. 3,767,629, which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer, and water-in-oil emulsifying agent utilizing a highshear, mixing technique followed by subjecting this emulsion to free radical polymerization conditions. Also of interest is U.S. Pat. No. 4,024,097 which describes water-in-oil emulsions, such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers, such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4–9.

Physical Properties of the Water-In-Oil Emulsions

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content, as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e., pumpable.

The Secondary Amine

The secondary amines which are useful in this invention contain alkyl groups containing 1–3 carbon atoms. Examples of materials which can be used include dimethylamine, diethylamine, methylethylamine, ethylpropylamine, methylpropylamine, etc. The amines used in this protion of the invention are, however, not used as straight amines but are, prior to their use, converted to their water-soluble chloride, sulfate, acetate, etc. salts. The salts of the secondary amines used must be water-soluble, and should be compatible with the water-in-oil emulsion to which they will be added. In the practice of this invention, the preferred secondary amine is dimethylamine, and the preferred salts to be employed are the chloride and sulfate salts. As such, dimethylamine hydrochloride and bis(dimethylamine) hydrosulfate are the preferred secondary amine salts of this invention. The preparation of salts of this type are well-known to those skilled in the art.

The Dry Formaldehyde Compositions

The dry formaldehyde compositions of this invention comprise three separate and individually useful ingredients. The formaldehyde per se, preferably in the form of paraformaldehyde is used in the mannich reaction itself. Along with the formaldehyde is used an alkalinity adjustment or control agent which is used to raise the pH of the final admixture, so as to allow the mannich reaction to proceed. Desired alkalinity adjustment agents include, alkaline earth metal oxides, alkali and alkaline earth metal carbonates, and bicarbonates. Preferably, the alkalinity adjustment agents are selected from the group consisting of calcium oxide, magnesium oxide, sodium carbonate, sodium becarbonate, potassium carbonate and potassium bicarbonate. Especially preferred alkalinity adjustment agents are calcium oxide and sodium carbonate. The alkalinity adjustment agents are generally present in the composition, so as to provide one mole of acid neutralization capability for each mole of formaldehyde present. Accordingly, if calcium oxide is used as an alakalinity adjustment agent, 0.5 mole of calcium oxide is employed for each mole of formaldehyde. While an approximate 1:1 mole neutralization capability to formaldehyde is preferred, generally from 0.5–1.5, and preferably 0.75–1.25 mole neutralization capability is used per mole of formaldehyde present in the composition.

The other ingredient in the formation of the dry formaldehyde composition is a water-soluble high HLB oil-in-water surfactant.

The Oil-In-Water Surfactants

The water-in-oil emulsions of the water-soluble polymers discussed above have the unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in the Anderson reference, the polymer-containing emulsions may be inverted by any number of means. The most convenient means in this invention resides in the use of a surfactant added to the water into which it is to be placed via the dry formaldehyde composition. The placement of a surfactant into the water causes the emulsion to rapidly invert and release the polymer in the form of an aqueous solution. When this technique is used to invert the polymer-containing emulsion, the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophillic and are further characterized as being water soluble. Any hydrophillic-type surfactant, such as ethoxylated octyl or nonyl phenols, ethoxylated octyl or nonyl phenol formaldehyde resins, dioctyl esters of sodium succinate and octyl or nonyl phenol polyethoxy ethanols, etc., can be used. Preferred surfactants are generally octyl or nonyl phenols which have been ethoxylated with between 8–15 moles of ethylene oxide. A more complete list of surfactants used to invert the emulsion are found in Anderson, U.S. Pat. No. 3,624,019, at columns 4 and 5.

In an especially preferred mode of this invention the oil-in-water surfactant used in the dry formaldehyde composition and which causes inversion of the water-in-oil emulsion are materials having the above-described properties but which are also solid or wax-like at normal temperatures. Materials of this type include Pluronic F-68, a condensate of ethylene oxide with a hydrophobic base formed by condensing propylene oxide with propylene glycol, available from BASF Wyandotte Corporation; Arlacel 165, a glycerol monostearate available from ICI America, Inc.; and Triton X-120, an alkylaryl polyether alcohol available from Rohm and Haas Company. Other solid, powdered, crystalline, prilled, fluke or waxy water soluble oil-in-water emulsifiers are also contemplated in the course of this invention.

Additionally, it is within the scope of this invention to use oil-in-water surfactants which have been absorbed onto water soluble inert supports. These supports include inorganic water soluble salts such as sodium carbonate, sodium bicarbonate, calcium hydroxide, calcium oxide, calcium sulfate, magnesium chloride, magnesium sulfate, sodium chloride, sodium nitrate, magnesium nitrate, calcium chloride, or the like. Inert supports may also be water soluble polymeric materials which have the capacity to absorb liquids such as polyacrylamide and the like.

While it is preferred to add the water soluble oil-in-water surfactant to the dry formaldehyde composition, it should be pointed out that this step is merely preferred, since the oil-in-water surfactant may also be employed and added directly to the water-in-oil emulsion. It is preferred to add the oil-in-water surfactant to the dry alkalinity control agent, however, for simplicity of use and ease of preparation of the water-in-oil emulsion.

The water soluble oil-in-water surfactant when used in the dry alkalinity control agent should be present at a level of from 0.05–10% based upon the weight of the water-in-oil emulsion to which the dry formaldehyde composition is to be added. It is only important that enough oil-in-water surfactant be present, so as to enable inversion of the water-in-oil emulsion in a later process step and excess amounts of surfactant are not harmful.

Process Steps of the Invention

Once the water-in-oil emulsion of the acrylamide polymer is formed, there is added to it either in solid or aqueous form the salt of the second lower alkyl secondary amine. The amine is generally added to the water-in-oil emulsion, so as to provide from 0.1–1.2 moles and preferably, 0.75–1.1 moles of secondary amine for each mole of amide functionality on the acrylamide polymer. Preferably, approximately 1.1 mole of secondary amine is added per mole of amide functionality present. It should be pointed out, however, that less moles of secondary amine can be used if it is desired to produce an ultimate end product which contains less cationic charge. In performing this step, it may be necessary to add to the water-in-oil emulsion additional water-in-oil emulsifying agent. If substantial quantities of water are added during this step, it may also be necessary to add additional hydrophobic liquid. These additions are suggested to maintain the stability of the water-in-oil emulsion.

The addition of the secondary amine salt to the water-in-oil emulsion is simply accomplished by mixing the secondary amine salt together with the water-in-oil emulsion. This step is generally performed at ambient temperatures and no heating or cooling will generally be needed. Once the secondary amine salt has been added to the water-in-oil emulsion, this part of the "product" is placed in storage containers for shipment to the site of the ultimate use of the cationically charged polymer.

The formation of the dry formaldehyde material is generally accomplished by simply bending paraformaldehyde, alkalinity control agent and oil-in-water surfactant together. Compositions of this type generally contain 10–70% by weight paraformaldehyde, 10–70% by weight alkalinity agent, and 1–20% by weight of high HLB oil-in-water surfactant. Preferably, this part of the composition of this invention will contain 20–60% by weight formaldehyde, 20–60% by weight inert carrier, preferably alkaline metal oxide, and 2–10% by weight high HLB oil-in-water surfactant. Most preferably, this composition will contain 30–60% by weight paraformaldehyde, 30–60% by weight inert carrier, and 2–7.5% by weight oil-in-water surfactant.

The blending of materials of this type can be accomplished in a simple dry mixer. This step is performed at ambient temperature, with no heating or cooling capacity being necessary. Finished dry, powdery formaldehyde composition is placed in suitable containers and shipped to where the end use of the polymer will take place.

It is at the end use site where the cationically charged copolymer of N,N-dimethylaminomethyl acrylamide is formed. This step is accomplished by mixing together in a suitable stirred vessel the water-in-oil emulsion of the acrylamide polymer containing the salt of the lower alkyl secondary amine and a sufficient quantity of the dry formaldehyde composition, so as to provide from 0.1–1.1 mole of formaldehyde per mole of secondary amine and from 0.05–10% water-soluble surfactant based on the water-in-oil emulsion used along with a quantity of water, so as to obtain a 0.1–20% by weight aqueous solution of poly N,N-dimethylaminomethyl acrylamide.

The Mannich reaction occurring in this final step is rapid and produces a cationically charged water-soluble polymer suitable for use as a flocculant in a matter of from several minutes to several hours. By the use of this method, the N,N-dimethylaminomethyl acrylamide polymer can be utilized prior to the time when a sufficient amount of crosslinking occurs, so as to damage the activity of the polymeric substance. Since no formaldehyde "scavengers" are employed, no noxious odors are produced by materials of this type in the final product and by the use of a solid formaldehyde material, formaldehyde vapors are controlled.

It will be seen that this invention provides an economical method for the preparation of high molecular weight cationically charged polymers from inexpensive starting materials which has heretofore not been possible by known commercial methods.

In order to illustrate this invention, the following examples are presented:

EXAMPLE 1

A water-in-oil emulsion of polyacrylamide was prepared similar to Example 1 of U.S. Pat. No. 3,979,348. This water-in-oil emulsion of acrylamide contained 28.18% low odor paraffin solvent (LOPS), 41.43% water, and 0.75 parts each of SPAN 80, a sorbitan mono oleate and "Alkaterge T," a substituted oxazaline-type surfactant. The polyacrylamide contained in the water-in-oil emulsion had a molecular weight of approximately 14 million. This material is used in all of the subsequent examples and is labeled Example 1.

EXAMPLE 2

To 500 grams of water-in-oil emulsion of Example 1 was added with stirring 159.6 grams of crystalline dimethylamine hydrochloride. After mixing, the material was stable and contained 20.09% polyacrylamide. This material is referred to throughout as Example 2.

EXAMPLE 3

Fifty-six grams of paraformaldehyde was blended with 52.29 grams of powdered calcium oxide and 5 grams of Pluronic F-68, an ethylene oxide condensate having an HLB value of 29. The resultant material contained 49.3% as active formaldehyde. This material is referred to throughout as Example 3.

EXAMPLE 4

The compositions of the instant invention are prepared as follows:

To 189.5 grams of water was added 8.96 grams of Example 2 and 1.51 grams of Example 3. With stirring, the water-in-oil emulsion inverted allowing solubilization of the polyacrylamide contained therein into the water. The Mannich reaction proceeded, producing a cationically modified dilute aqueous solution of polyacrylamide. This experiment was repeated using the following ingredients:

8.96 grams Example 2
1.38 grams Example 3
169.66 grams water 8.96 grams Example 2
1.23 grams Example 3
169.81 grams water 8.96 grams Example 2
1.08 grams Example 3
169.96 grams water 8.96 grams Example 2
0.92 grams Example 3
170.12 grams water 8.96 grams Example 2
1.61 grams Example 3[1]
169.43 grams water Footnote[1]—additional pluronic added.

Each of the above experiments produced dilute aqueous solutions of the cationically modified polyacrylamide.

EXAMPLE 5

To 100 grams of Example 1 was added 31.92 grams of the hydrochloride salt of dimethylamine. This mixture was stable. A dry formaldehyde mixture was prepared by mixing together 11.2 grams paraformaldehyde, 20.70 grams anhydrous sodium carbonate, 1.0 grams of Arlacel 165, a glycerol monostearate.

Nine and six tenths grams of the latex, including the dimethylamine hydrochloride, was then added to 168.68 grams of deionized water followed by 2.26 grams of the dry formaldehyde mixture. The mixture thickened immediately and colloidal titrations were done on this material at varying intervals. After ½ hour, colloidal titrations showed 6.6% cationic charge. After 1 hour, 9.1% cationic charge and after 66 hours, 41.2% cationic charge.

Repeating the above but substituting for the Arlacel 165 an equal amount of Pluronic F-68, the mixture developed 14.9% cationic charge in 1 hour and 45.6% in 66 hours.

The resultant dilute aqueous solutions of N,N-dimethylaminomethyl acrylamide can be used for the dewatering of sewage, industrial waste or may ultimately be employed as retention aids and the like in the manufacture of paper. By the use of the cationic polymer of this invention, crosslinking during polymer storage is avoided, since the reaction itself is accomplished on site. Additionally, by the use of this invention, highly active and inexpensive cationic polymers can be prepared on site using simple mixing tanks which may be as crude as an empty chemical drum and a hand-operated stirring device.

Having thus described our invention, we claim:

1. A method of rapidly preparing a dilute aqueous solution of poly N,N lower dialkylaminomethyl acrylamide and copolymers thereof having a molecular weight greater than 500,000 and a cationic charge of 1–9% which comprises:

A. forming a water-in-oil emulsion of a water-soluble acrylamide polymer containing at least 10% by weight of acrylamide, said water-in-oil emulsion containing in weight percentages:
      (1) 5 to 60% polymer;
      (2) 5 to 75% organic hydrophobic liquid;
      (3) 0.1 to 21% low HLB water-in-oil emulsifying agent;
      (4) 2 to 90% water;
   B. adding to the water-in-oil emulsion of step A a water-soluble salt of a secondary amine having alkyl groups contaning 1–3 carbon atoms in an amount so as to provide 0.1–1.1 moles of secondary amine for each mole of amide functionality on said polymer;
   C. preparing a dry formaldehyde composition by mixing together:
      (1) paraformaldehyde;

(2) dry alkalinity control agent;
(3) water-soluble high HLB surfactant capable of inverting the water-in-oil emulsion of step A, the dry alkalinity control agent being present in an amount to provide from 0.5–1.5 moles of neutralization capability per mole of formaldehyde;

D. mixing together the water-in-oil emulsion containing the lower alkyl secondary amine salt with a quantity of the dry formaldehyde composition sufficient to provide from 0.1–1.1 mole of formaldehyde per mole of secondary amine and from 0.05–10% water-soluble surfactant based on the weight of water-in-oil emulsion used with a quantity of water, so as to obtain a 0.1–10% by weight aqueous solution of poly N,N-dialkylaminomethyl acrylamide.

2. The method of claim 1 wherein in step A the water-in-oil emulsion of the water-soluble acrylamide polymer contains:
A. 20 to 40% polymer;
B. 5 to 40% paraffinic hydrophobic liquid;
C. 1 to 15% low HLB water-in-oil emulsifying agent;
D. 20 to 70% water.

3. The method of claim 1 wherein in step A the water-in-oil emulsion of the water-soluble acrylamide polymer contains:
A. 25 to 35% polymer;
B. 20 to 30% paraffinic hydrophobic liquid;
C. 1.2 to 10% low HLB water-in-oil emulsifying agent;
D. 30 to 55% water.

4. The method of claim 1 wheren the polymer of step A is a homopolymer of acrylamide.

5. The method of claim 1 wherein in step B from 0.75–1.1 mole of lower alkyl secondary amine is added per mole of amide functionality present in the polymer; and in step D, from 0.75–1.0 mole of formaldehyde is added per mole of secondary amine.

6. The method of claim 1 wherein the water-soluble salt of the lower alkyl secondary amine is dimethylamine hydrochloride.

7. The method of claim 5 wherein the water-soluble salt of the lower alkyl secondary amine is dimethylamine sulfate.

8. The method of claim 1 wherein the secondary amine is dimethylamine.

9. The method of claim 5 wherein the secondary amine is dimethylamine.

* * * * *